Jan. 22, 1935.  W. G. G. GODRON  1,988,726
SEALING DEVICE
Filed Oct. 31, 1933
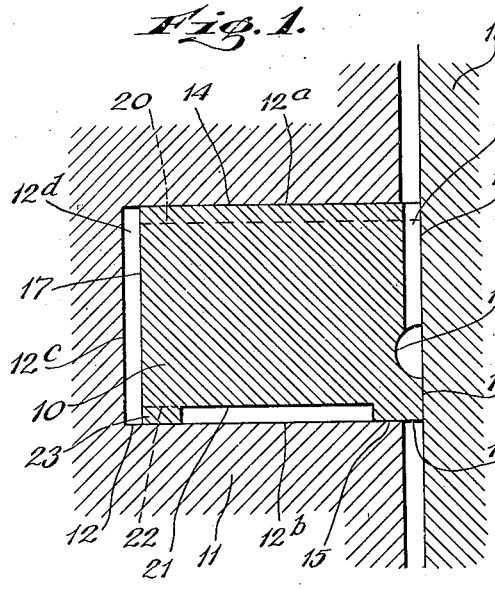
Fig. 1.
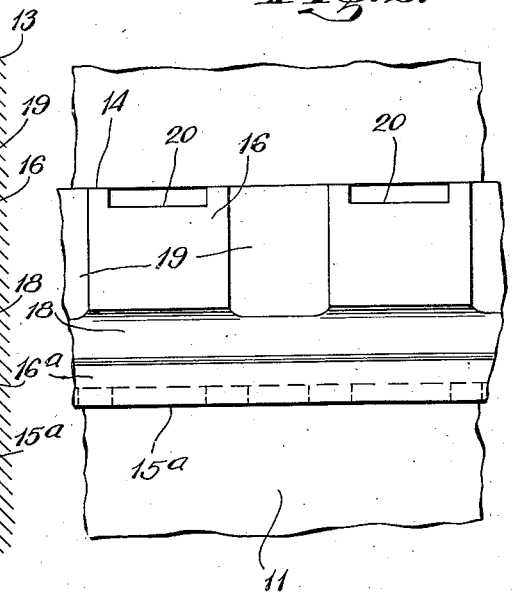
Fig. 2.
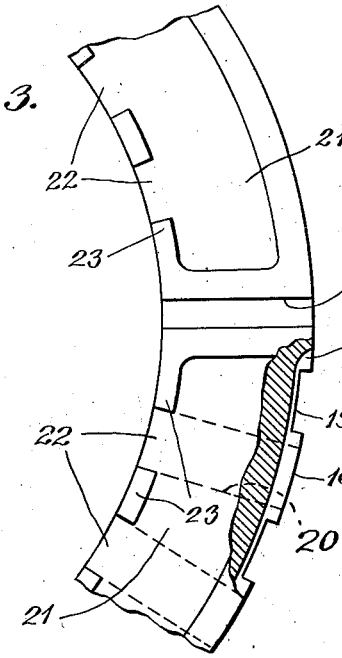
Fig. 3.
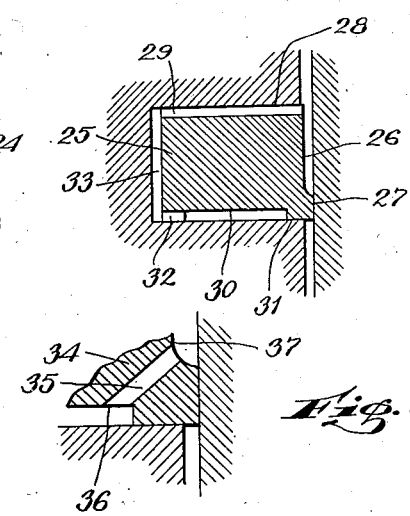
Fig. 4.
Fig. 5.
INVENTOR
WILLIAM G.G. GODRON
BY
*Howard E Thompson*
ATTORNEY Patented Jan. 22, 1935

1,988,726

UNITED STATES PATENT OFFICE 1,988,726

SEALING DEVICE

William G. G. Godron, New York, N. Y.

Application October 31, 1933, Serial No. 695,971

11 Claims. (Cl. 309—31)

This invention relates to sealing devices or rings employed in connection with pistons and other reciprocating members to effect a seal or substantial seal of the reciprocating member in the cylinder or body in which the same is movably mounted; and the object of the invention is to provide a device of the class described which is so constructed and mounted in the ring groove of a piston or other member as to expose all four surfaces of the device to the prevailing pressure so as to provide a substantially balanced or what might be termed free floating mounting of the device or ring in the groove of said member; a further object being to provide a sealing device or ring wherein the outer or front surface as well as side surface thereof opposed to the surface directly exposed to the prevailing pressure are provided with relatively small annular sleeve surfaces contacting the cylinder wall and the wall of the ring groove respectively to eliminate excessive frictional engagement of said surfaces of the ring with the surfaces engaged thereby; a further object being to provide a sealing device or ring wherein the outer or front surface is provided with an annular or circumferential groove or recess opening directly through one side surface of the ring to permit the prevailing pressure to enter said groove or recess to relieve outward pressure of the ring on a cylinder wall; a further object being to provide the outer or front surface of the ring with recesses forming correspondingly spaced bearing portions, the recesses serving as ducts or channels for permitting the pressure to pass over said front surface of the ring into the annular groove and further to the provision of radial recesses in the upper surface of the ring preferably disposed intermediate the first named recesses and through which the pressure passes to the back surface of the ring with recesses or grooves formed in the lower surface of the ring through which the pressure is adapted to pass into an annular or circumferential groove formed on said lower surface of the ring inwardly of the front surface thereof; a still further object being to provide a device of the class described wherein radial ports or passages are provided for placing the annular groove on the front surface of the ring in communication with the annular groove on the lower surface thereof; and with these and other objects in view, the invention consists in a sealing device or ring of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is an enlarged sectional detail view through a sealing device made according to my invention and indicating its method of mounting.

Fig. 2 is a detail view of the front surface of the sealing device shown in Fig. 1 and showing only a part of the construction.

Fig. 3 is a bottom plan view of the device shown in Figs. 1 and 2 detached, showing only a part of the construction and with parts broken away and in section.

Fig. 4 is a view similar to Fig. 1 showing a slight modification; and,

Fig. 5 is a sectional detail view similar to Figs. 1 and 4 showing another modification.

In Figs. 1 to 3 inclusive, I have shown at 10 one form of sealing device or ring which I employ. At 11 I have indicated a part of a piston or reciprocating member having a groove 12 for receiving the device 10 and at 13 I have indicated part of a cylinder wall. For the purpose of this description, the side surface 14 of the ring will be regarded as the upper surface to be descriptive of the surface exposed to the prevailing pressure, it being understood at this time that in some uses and especially in double acting pistons or pumps, this surface may actually be a lower surface. 15 designates the lower side surface, or in other words, the surface opposed to the surface 14, 16 the outer or front surface, and 17 the back surface, whereas the groove 12 has a corresponding upper surface 12a, lower surface 12b and back surface 12c.

In carrying my invention into effect, I provide the front surface 16 of the ring with an annular or circumferential groove or recess 18 which opens through the upper surface 14 in the construction shown in Figs. 1 to 3 inclusive through a series of grooves or recesses 19. Intermediate the grooves 19, the upper surface 14 is provided with correspondingly spaced radial grooves or recesses 20 which open through the front surface 16 and back surface 17. Thus, the prevailing pressure entering as indicated by the arrow $x$, Figure 1, is free to pass into the annular groove 18 through the grooves or recesses 19 as well as into a recess 12d formed between the back surface 17 of the device 10 and the back surface 12c of the ring groove through the radial grooves or recesses 20 and from the recess or chamber 12d, the pressure is also free to pass into an annular or circumferential groove 21 formed in the lower surface 15d of the device through radial grooves or passages 22 which are formed in the flange portion 23 which remains on the lower surface of the sealing device adjacent the back surface thereof in forming the groove 21. If the sealing device or ring be of the split or sectional type having the ends or parts joined as indicated at 24 in Fig. 3 of the drawing, the grooves 18 and 21 will terminate short of this split or subdivision as clearly indicated in Fig. 3 of the drawing so that the prevailing pressure in said grooves cannot pass directly into said subdivision and the only leakage occurring being by the usual clearances allowed and by any possible blow-by that may exist at these points of intersection.

A ring constructed as described will provide two annular or substantially annular bearing surfaces, namely an outer or front surface 16a and a lower surface 15a, the first surface being formed between the groove 18 and the lower surface 15 and the latter between the surface 16a and the groove 21, being of sufficient width to extend into the groove 12 of the piston and effect a seal. However, both of these surfaces are comparatively narrow and thus in conjunction with the grooves and recesses on the surfaces 15 and 16 serve to materially reduce the frictional engagement of the sealing device with the wall of the cylinder 13 and with the bottom wall 12b of the ring groove, it being further understood that the balancing of the pressures on the four surfaces of the ring or sealing device provides a substantially full floating or balanced mounting of the ring in the piston and with respect to the cylinder wall, permitting free action of the ring to perform its sealing characteristics and eliminating to a major degree the possibility of seizing the ring in the ring groove or upon the cylinder wall.

In Fig. 4 of the drawing, I have shown a slight modification of the structure shown in Figs. 1 to 3 inclusive, wherein the sealing device or ring 25 is identical to the ring 10 shown in said figures with the one exception that substituted for the annular groove 18 and the grooves or recesses 19 is a single annular groove or recess 26 which extends from the bearing surface 27 similar to the surface 16a to and opens through the upper surface 28 of the ring. In other words, the ring 25 also includes the radial grooves 29 in the upper surface thereof similar to the grooves 20, the circumferential groove 30 in the lower surface 31 and including the radial grooves or recesses 32 which open through the back surface 33 of said ring as well as into the groove 30.

In Fig. 5 of the drawing, I have shown the lower corner portion of a ring or sealing device which may be equivalent to the ring 10 or the ring 25, and this ring 34 has radial ports or passages 35 which place a bottom groove 36 similar to the grooves 21, 30 in communication with a groove 37 on the outer surface of the ring and similar to the grooves 18 or 26. Aside from this change, the structure of the ring will be the same as that of the ring shown in said other figures. With this construction, it will be understood that the pressure that may prevail in either of the grooves 36 and 37 will be balanced by virtue of the communication therebetween established by the radial ports or passages 35.

By providing the grooves on the upper surface of the ring or sealing device, a more accurate fitting of the ring may be provided in the ring groove, and it will be understood at this time that the circumferential length of the grooves or recesses 19, 20, 22 may be comparatively large to materially reduce the frictional contact surface of the parts intermediate such grooves or recesses which engage the walls of the ring groove as well as the cylinder wall, and this also applies to the grooves 29, 32, 36 and 37, it being understood that the groove 26 is circumferential, leaving only the narrow bearing surface 27 on the front wall of the ring.

Having fully described my invention, what I claim as new and desire to secure by Letters Patent, is:

1. A sealing device comprising a ring having front, back and side surfaces, one side surface having a wide circumferential groove extending from a point inwardly of and adjacent the front surface of the ring and communicating with the rear surface of said ring through radial passages, the front surface of the ring having a circumferential groove adjacent said side surface of the ring, and said front surface having circumferentially spaced recesses extending from said circumferential groove and opening out through the other side surface of the ring.

2. A sealing device comprising a ring having front, back and side surfaces, one side surface having a wide circumferential groove extending from a point inwardly of and adjacent the front surface of the ring and communicating with the rear surface of said ring through radial passages, the front surface of the ring having a circumferential groove adjacent said side surface of the ring, said front surface having circumferentially spaced recesses extending from said circumferential groove and opening out through the other side surface of the ring, the last named side surface of the ring having circumferentially spaced radial grooves disposed intermediate the recesses on the front surface thereof, and said radial grooves opening through the front and back surfaces of the ring.

3. A sealing ring for front, back and side surfaces, the front surface having a circumferential groove and communicating passages, said passages opening through one side surface, and the other side surface having a circumferential groove and communicating passages, said last mentioned passages opening through the back surface of the ring, and means providing communication between the prevailing pressure at the first side surface of the ring and the second named side surface thereof.

4. A sealing ring for front, back and side surfaces, the front surface having a circumferential groove and communicating passages, said passages opening through one side surface, and the other side surface having a circumferential groove and communicating passages, said last mentioned passages opening through the back surface of the ring, means providing communication between the prevailing pressure at the first side surface of the ring and the second named side surface thereof, the groove of the front surface terminating inwardly of and adjacent the second named side surface, and the groove in said second named side surface terminating inwardly of and adjacent the front surface, to provide on the front and second named side surfaces of the device comparatively narrow circumferential sealing areas for sealing the device upon adjacent walls engaged thereby.

5. A sealing ring for front, back and side surfaces, the front surface having a circumferential groove and communicating passages, said passages opening through one side surface and the other side surface having a circumferential groove and communicating passages, said last mentioned passages opening through the back surface of the ring, means providing communication between the prevailing pressure at the first side surface of the ring and the second named side surface thereof, and said means comprising radial recesses on the first named side surface of the ring and opening through the front and back surfaces thereof.

6. A sealing ring for front, back and side surfaces, the front surface having a circumferential groove and communicating passages, said passages opening through one side surface and the other side surface having a circumferential groove and communicating passages, said last mentioned passages opening through the back surface of the ring, means providing communication between the prevailing pressure at the first side surface of the ring and the second named side surface thereof, said means comprising radial recesses on the first named side surface of the ring and opening through the front and back surfaces thereof, and said ring having radial ports for placing the circumferential grooves in communication with each other.

7. A piston ring for use in a piston provided with a ring receiving groove, said ring comprising front, back, upper and lower side surfaces, said upper surface being adapted to be exposed to a pressure which normally urges said lower side surface into contact with an adjacent surface of said groove, said lower side surface being provided with an annular groove disposed substantially inwardly of said front surface and also having a plurality of radial passages extending inwardly from said annular groove to said back surface, said annular groove and said radial grooves being exposed to said pressure whereby excessive friction between said lower side surface and said adjacent surface is eliminated by partially balancing the pressure on said upper side surface, and the front surface of the ring having an annular groove and passages extending from said groove and opening through the upper surface of the ring to expose said grooved front surface to said pressure to relieve frictional engagement of the front surface of the ring with an adjacent surface engaged thereby.

8. In a reciprocating member having a ring groove, a sealing device in said groove, said device having front, back and side surfaces, one of said side surfaces being exposed to prevailing pressure in the operation of said reciprocating member, means comprising an annular groove in the opposed side surface of the device and disposed substantially inwardly of said front surface and opening through radial grooves to the back surface of the device whereby said opposite side surface is exposed to said prevailing pressure to eliminate excessive friction between said sealing device and said reciprocating member, and the front surface of said device having an annular groove and passages extending from said groove and opening through the first side surface of the device whereby said front surface is exposed to said pressure to reduce frictional engagement of the front surface with an adjacent wall engaged thereby.

9. In a reciprocating member having a ring groove, a sealing device in said groove, said device having front, back and side surfaces, one of said side surfaces being exposed to prevailing pressure in the operation of said reciprocating member, means comprising an annular groove in the opposed side surface of the device and disposed substantially inwardly of said front surface and opening through radial grooves to the back surface of the device whereby said opposite side surface is exposed to said prevailing pressure to eliminate excessive friction between said sealing device and said reciprocating member, the front surface of said device having an annular groove and passages extending from said groove and opening through the first side surface of the device whereby said front surface is exposed to said pressure to reduce frictional engagement of the front surface with an adjacent wall engaged thereby, and said first named side surface having radial passages opening through said front and back surfaces.

10. In a reciprocating member having a ring groove, a sealing device in said groove, said device having front, back and side surfaces, one of said side surfaces being exposed to prevailing pressure in the operation of said reciprocating member, means comprising an annular groove in the opposed side surface of the device and disposed substantially inwardly of said front surface and opening through radial grooves to the back surface of the device whereby said opposite side surface is exposed to said prevailing pressure to eliminate excessive friction between said sealing device and said reciprocating member, the front surface of said device having an annular groove and passages extending from said groove and opening through the first side surface of the device whereby said front surface is exposed to said pressure to reduce frictional engagement of the front surface with an adjacent wall engaged thereby, said first named side surface having radial passages opening through said front and back surfaces, and the device having ports placing said annular grooves in communication.

11. In a reciprocating member having a ring groove, a sealing device in said groove, said device having front, back and side surfaces, one of said side surfaces being exposed to prevailing pressure in the operation of said reciprocating member, means comprising an annular groove in the opposed side surface of the device and disposed substantially inwardly of said front surface and opening through radial grooves to the back surface of the device whereby said opposite side surface is exposed to said prevailing pressure to eliminate excessive friction between said sealing device and said reciprocating member, the front surface of said device having an annular groove and passages extending from said grooves and opening through the first side surface of the device whereby said front surface is exposed to said pressure to reduce frictional engagement of the front surface with an adjacent wall engaged thereby, and means for placing the annular grooves in communication with each other.

WILLIAM G. G. GODRON.